US009128280B2

(12) United States Patent
Leguijt et al.

(10) Patent No.: US 9,128,280 B2
(45) Date of Patent: Sep. 8, 2015

(54) ELECTROWETTING DISPLAY DEVICE

(71) Applicant: Liquavista B.V., Eindhoven (NL)

(72) Inventors: Robin Leguijt, Eindhoven (NL); Romaric Mathieu Massard, Eindhoven (NL); Andrea Giraldo, Riehen (CH)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/305,566

(22) Filed: Jun. 16, 2014

(65) Prior Publication Data

US 2014/0293396 A1 Oct. 2, 2014

Related U.S. Application Data

(63) Continuation of application No. PCT/EP2012/075655, filed on Dec. 14, 2012.

(30) Foreign Application Priority Data

Dec. 16, 2011 (GB) .................................. 1121732.0

(51) Int. Cl.
*G02B 26/00* (2006.01)
*G09G 3/34* (2006.01)
*G02B 26/02* (2006.01)

(52) U.S. Cl.
CPC .............. *G02B 26/005* (2013.01); *G09G 3/348* (2013.01); *G02B 26/02* (2013.01); *G09G 2300/0421* (2013.01); *G09G 2300/0426* (2013.01); *G09G 2300/0452* (2013.01); *G09G 2300/0814* (2013.01); *G09G 2300/0852* (2013.01); *G09G 2310/0205* (2013.01); *G09G 2310/0232* (2013.01); *G09G 2310/0264* (2013.01)

(58) Field of Classification Search
CPC .... G02B 26/00; G02B 26/004; G02B 26/005; G02B 26/007; G02B 26/02; G09G 3/348; G09G 3/344; G09G 3/3446; G09G 2300/0452; G09G 2300/0852; G09G 2300/0809; G09G 2300/0469; G09G 2300/0426; G09G 2310/0232; G09G 2310/0264; Y10T 29/49117
USPC ................. 359/290, 291, 295, 228, 245, 253; 345/55, 61, 72, 84, 204, 211, 212, 690; 445/24
See application file for complete search history.

(56) References Cited

U.S. PATENT DOCUMENTS

| 8,749,865 | B2 * | 6/2014 | Choi et al. | ..................... 359/228 |
| 8,842,360 | B2 * | 9/2014 | Shim et al. | ..................... 359/295 |
| 8,854,718 | B2 * | 10/2014 | Jung et al. | ..................... 359/290 |
| 2008/0204370 | A1 | 8/2008 | Feenstra et al. | |

(Continued)

FOREIGN PATENT DOCUMENTS

| JP | 2006195135 A | 7/2006 |
| WO | 03071346 A1 | 8/2003 |
| WO | 2006017129 A2 | 2/2006 |

(Continued)

*Primary Examiner* — Loha Ben
(74) *Attorney, Agent, or Firm* — BainwoodHuang

(57) ABSTRACT

A display apparatus includes an electrowetting display device with a first support plate, a second support plate and first and second fluids immiscible with each other in a space between the support plates. The first support plate has a display region comprising multiple display areas, each display area being associated with an electrode, the coverage of the first fluid over the display areas being independently controllable.

23 Claims, 12 Drawing Sheets

(56) References Cited

U.S. PATENT DOCUMENTS

2008/0297880 A1 12/2008 Steckl et al.
2011/0080439 A1 4/2011 Matsuoka et al.

FOREIGN PATENT DOCUMENTS

| WO | 2007141219 A1 | 12/2007 |
| WO | 2008119774 A1 | 10/2008 |

* cited by examiner

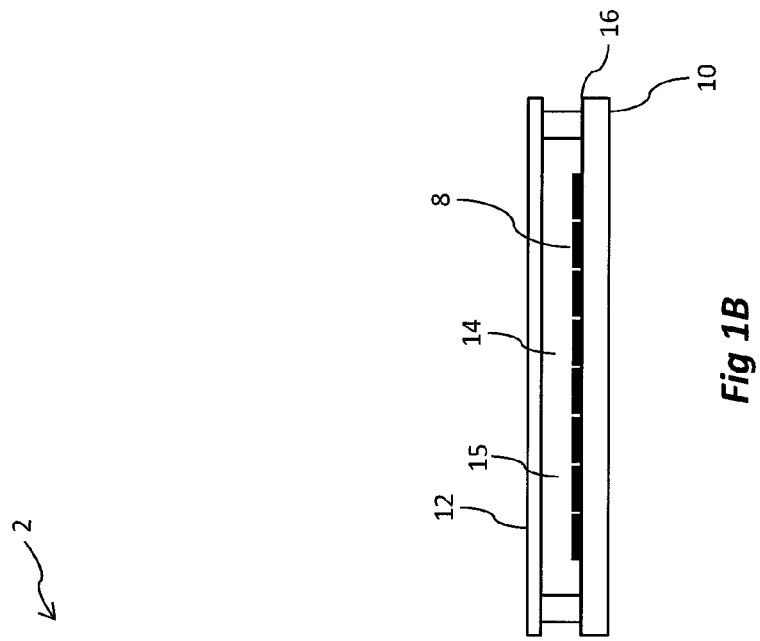
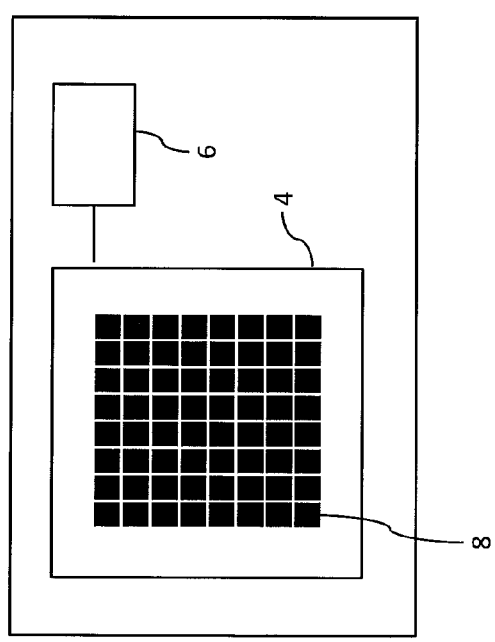
Fig 1A
Fig 1B

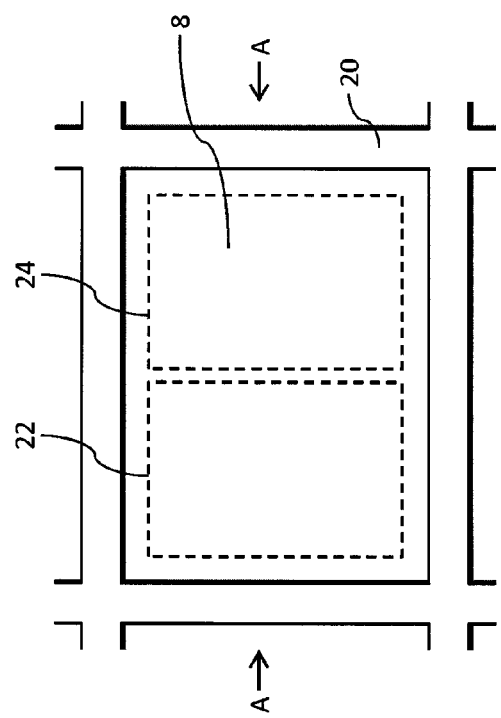
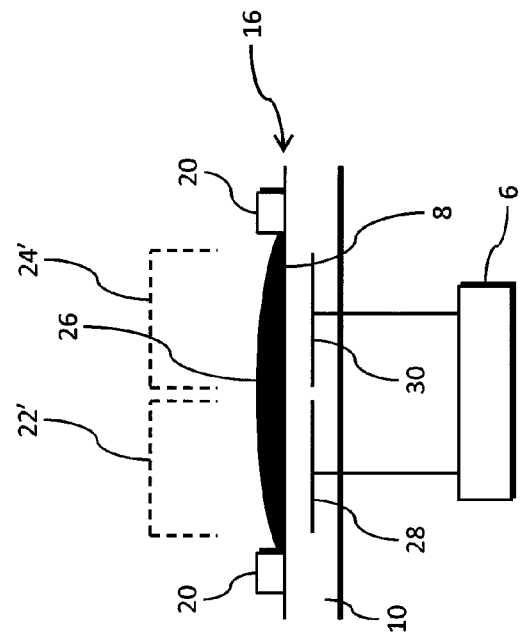
Fig 2A
Fig 2B

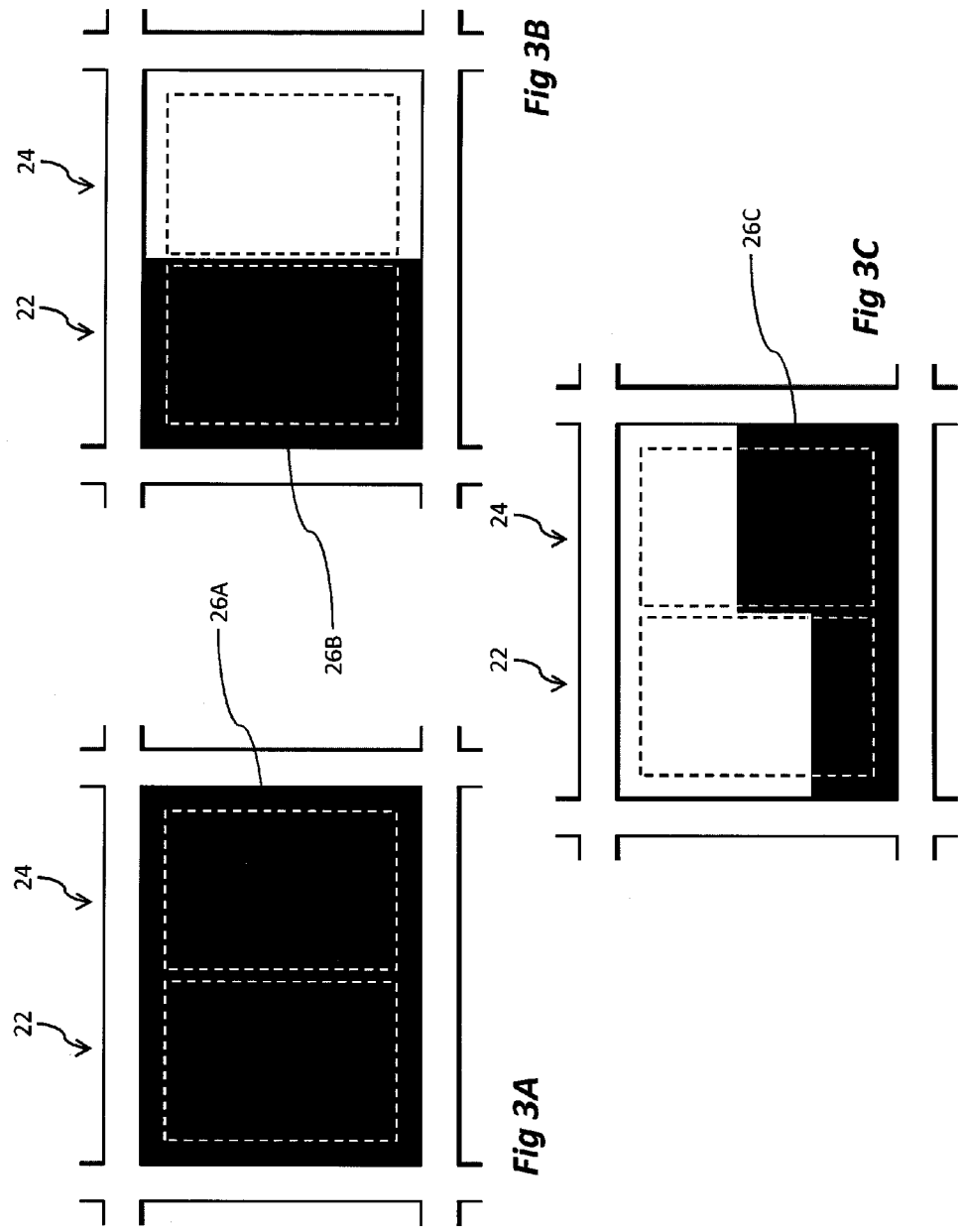

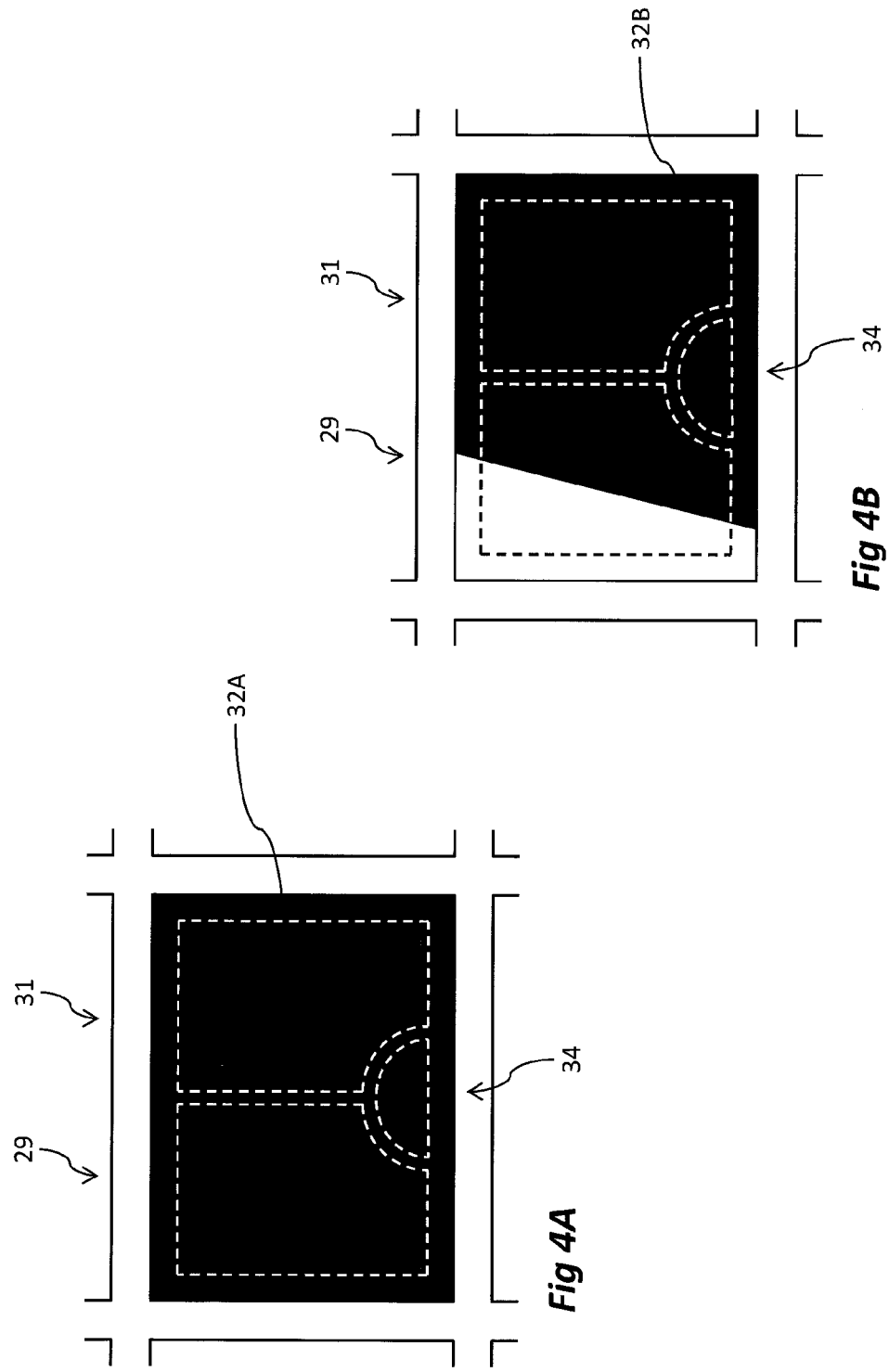

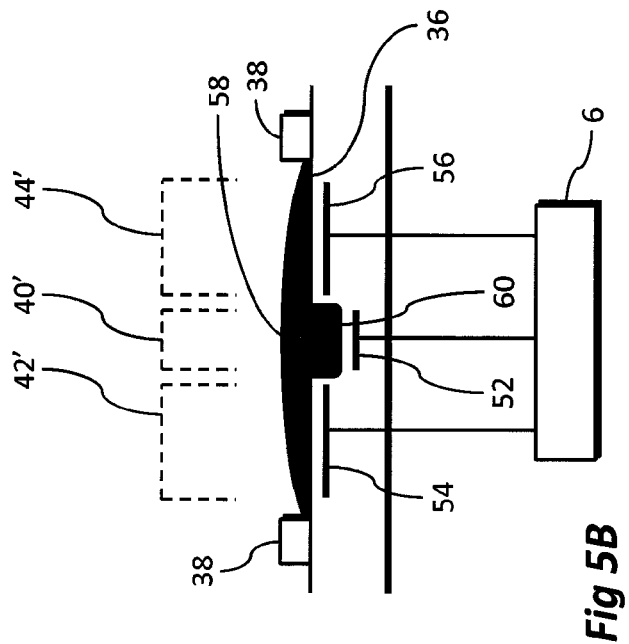
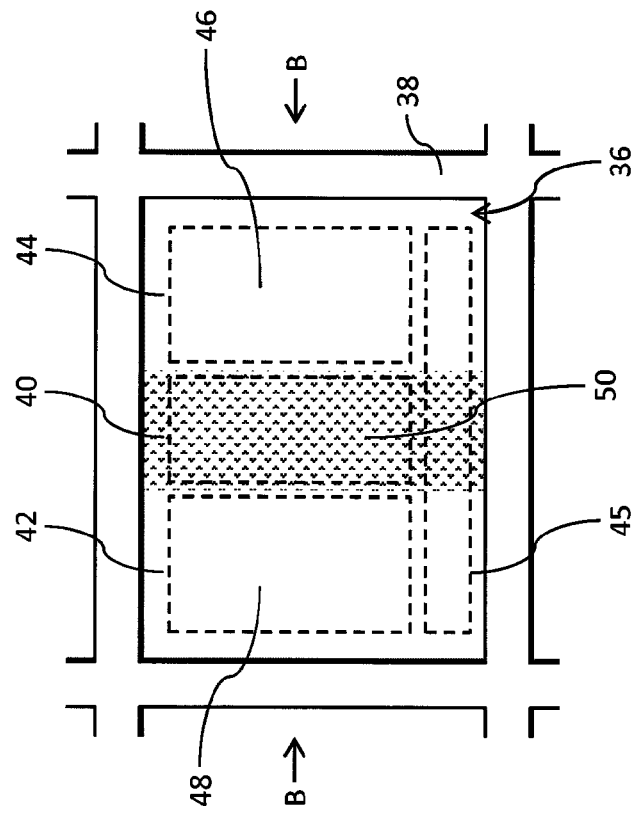
Fig 5A
Fig 5B

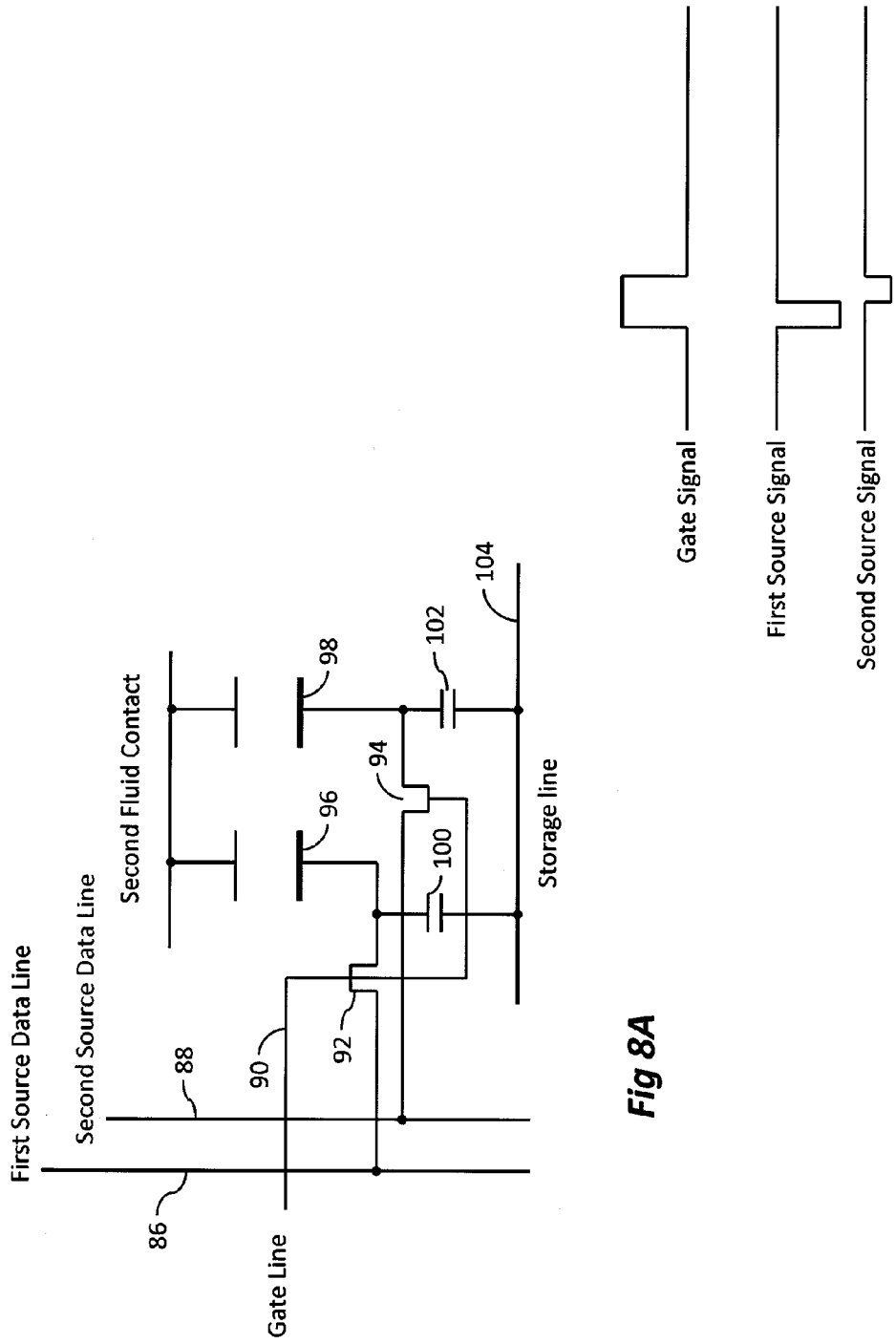

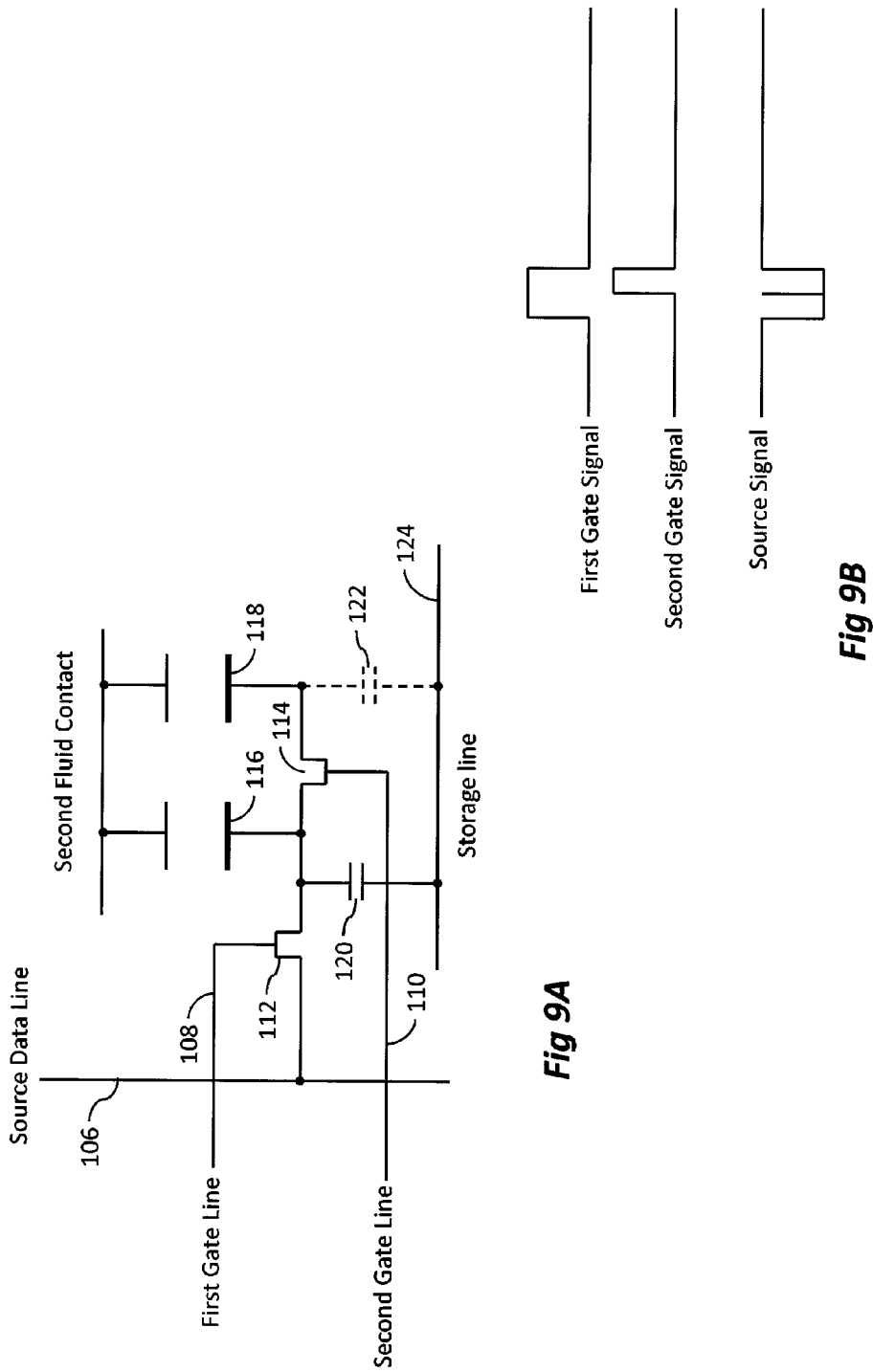

ELECTROWETTING DISPLAY DEVICE

CROSS REFERENCE TO RELATED APPLICATIONS

This application is a continuation of PCT International Application No. PCT/EP2012/075655 filed Dec. 14, 2012.

BACKGROUND

A known electrowetting display apparatus comprises first and second immiscible fluids between first and second support plates. The first support plate has a plurality of display areas for forming images thereon each display area confining a portion of the first fluid. This can be done by forming each display area as a first surface, less wettable to the second fluid than a second surface which forms a boundary to the first surface. The first surface has a layer of the first fluid upon it when the device is not in operation, the first fluid being constrained in the display area by the second surface. The first fluid is electrically non-conductive and may for instance be an alkane like hexadecane, or silicone oil. The second fluid is electrically conductive or polar, and may be water or a salt solution such as a solution of potassium chloride in a mixture of water and ethyl alcohol.

An electrode is positioned below the display area and when a voltage is applied between this electrode and the second fluid, the second fluid is attracted to the first surface. Accordingly, the first fluid is displaced. The configuration of the first and second fluid can therefore be controlled to provide a display effect in the display area.

It is desirable to provide an improved electrowetting display.

BRIEF DESCRIPTION OF DRAWINGS

FIGS. 1A and 1B show schematic diagrams of a generalised display apparatus which may form embodiments;

FIGS. 2A and 2B show schematic diagrams of a display region according to an embodiment;

FIG. 3A to 3C show the display region of FIGS. 2A and 2B in operation;

FIG. 4A to 4D show an alternative display region in operation; according to an embodiment;

FIGS. 5A and 5B show schematic diagrams of a display region according to a further embodiment;

FIGS. 7A to 9B show driving circuitry according to embodiments; and

Several parts and components appear in more than one Figure; for the sake of clarity the same reference numeral will be used to refer to the same part and component in all of the Figures.

DETAILED DESCRIPTION

Figure 4D:
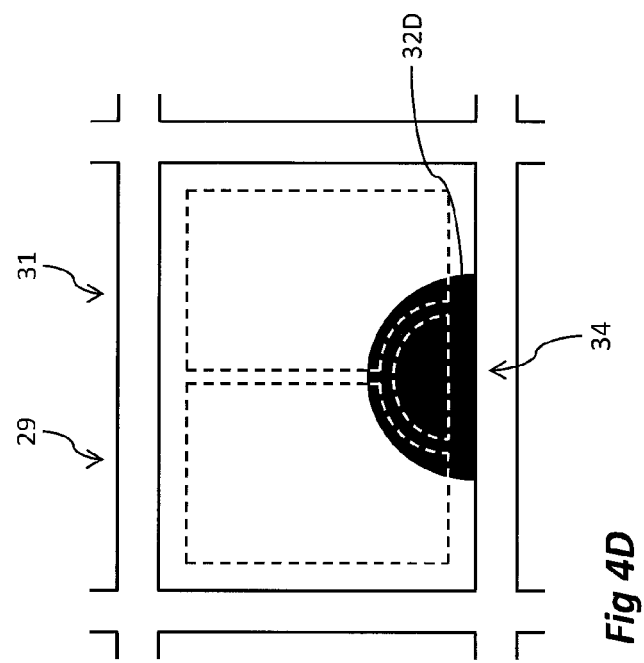

The entire contents of the following applications are incorporated by reference herein:
PCT/EP2012/075655 filed Dec. 14, 2012
GB 1121732.0 filed Dec. 16, 2011

Embodiments described herein relate to an electrowetting display apparatus and in particular to a display apparatus having a display region associated with multiple electrodes.

Prior to describing examples of embodiments in detail, embodiments will be described in summary form.

In accordance with embodiments, there is provided a display apparatus including an electrowetting display device and a display driving system, the electrowetting display device comprising a first support plate, a second support plate and a space between the first and second support plates, there being in the space a first fluid and a second fluid immiscible with each other, the first support plate having a plurality of display regions on a surface facing the space, the first fluid adjoining the surface and being confined to and movable over the display region; the display region comprising at least a first display area and a second display area; the first support plate comprising at least a first electrode and a second electrode, the first electrode being associated with the first display area and the second electrode being associated with the second display area, wherein the display driving system is arranged to apply first and second voltages to the first and second electrodes respectively to control a coverage of the first fluid over the display region, and the display apparatus is arranged such that the coverage of the first fluid over the first display area and the coverage of the first fluid over the second display area are independently controllable.

In known display apparatuses, the first fluid is confined to a single display area having a single controllable electrode associated with it. A voltage may be applied to the single electrode to vary the coverage of the first fluid, and thus create a display effect. By applying a voltage to the electrode, a voltage or potential difference is created between the second fluid and the electrode. To enable this, a further electrode is provided in the second fluid (which is conductive).

By contrast, the display apparatus of the present embodiments has a display region in which the first fluid is confined and over which the first fluid is movable (i.e. the fluid is not confined to any particular display area of the display region). The display region further has (at least) first and second display areas associated with respective electrodes such that the coverage of the first fluid over the display areas is independently controllable. The number of independently controllable display areas may thus be increased. This may be used to increase the resolution of the display.

Moreover, the display apparatus is arranged such that the coverage of the first fluid over the first display area and the coverage of the first fluid over the second display area are independently controllable. This means that the display apparatus provides two (or more) independently controllable display areas, able to provide a different display effect independently of each other.

If, by contrast, a display apparatus is configured with two electrodes so as to create a bi-stable device, the electrodes operate together to move the first fluid from a display area associated with one electrode to a display area associated with a second electrode and back again. Thus such a display can only provide one or other of two display effects dependent on the position of the first fluid. Such a device may be used for a switching device (i.e. having only two states), but cannot be used for a device able to independently control the coverage of the first fluid over the two display areas.

In an embodiment the first fluid confined within the display region may occupy a continuous volume.

The electrowetting display device operates by controlling the coverage of the first fluid over the display areas. In so changing the coverage, a portion of the display region is always covered by a portion of the first fluid (i.e. the portion of the display region acts as a collection area for the first fluid). This need for such a collection area limits the display performance which may be achieved by the display device by reducing the aperture achievable by the display area. In embodiments, the first fluid within a display region occupies a continuous volume; that is, the first fluid is shared between the display areas within the given display region and is not divided into separate volumes. In doing so, the display performance can be improved since one display area may act as a collection area for an adjacent display area within the display region. Thus the size of any collection area may be reduced (or the collection area may be entirely removed), improving the display performance of the display device.

In an embodiment the display region may comprise a collection area. The collection area may be associated with a further electrode which is maintained at a predetermined voltage. The predetermined voltage may be zero.

A portion of the display region may not be associated with an electrode (at least an electrode which is controllable), and thus may provide a collection area for the first fluid within the display region. In some embodiments, the portion (e.g. the collection area) may be associated with a further electrode, which may not be controllable, or rather may be held at a predetermined voltage (which may be zero volt). The location of the electrode defines the location of the collection area, thereby improving the control of the motion of the first fluid.

In an embodiment the display device may comprise a plurality of colour filters associated with the display regions, and a given display region may be associated with at least two differently coloured filters. The display region may comprise a first display area, a second display area and a third display area, and wherein the first, second and third display areas may be associated with differently coloured filters.

In embodiments, the display device is a colour display device i.e. at least some of the display areas are associated with a colour filter. Thus, in any given region at least some of the different display areas may be provided with different colour filters. For instance, in one embodiment, a display region may have two display areas, one associated with a red filter and the other with a blue filter. Other combinations of e.g. the additive primary colours red, green and blue, the subtractive primary colours cyan, magenta and yellow, and white (i.e. no filter) may be used.

In an embodiment the first display area may be arranged to reflect incident light, and the second display area may be arranged to transmit light, and the display device may comprise a light source arranged to provide light to be transmitted through the second display area. In addition, the surface may be configured such that a depth of the first fluid adjoining the second display area is greater than a depth of the first fluid adjoining the first display area. The display region may comprise two said first display areas and one said second display area.

In some embodiments, the display region may be arranged to selectively provide transmissive, reflective or transflective operation for the display device. This selectivity may be provided by independently controlling the coverage of the first fluid over transmissive and reflective display areas within a display region. A combination of both transmissive and reflective operation may provide transflective performance. Therefore an improved display, which may adapt to the ambient conditions (i.e. by providing one of transmissive, reflective or transflective operation) may be provided. In some embodiments the depth of the first fluid over the transmissive display area may be greater than the depth of the first fluid over the reflective display area. Depth in this context is the thickness of the first fluid in a direction perpendicular to the surface of the first support plate. This means that light travels a similar distance through the first fluid, since over the reflective display area, the light passes through the first fluid twice, whereas over the transmissive display area light only passes through the first fluid once. This improves the consistency of the performance of the device. There may be a two-fold difference in depth; that is the transmissive display area has twice the depth of the reflective display area.

In an embodiment a plurality of gates may be associated with each display region, the plurality of gates being arranged to selectively connect a variable voltage source of the display driving system to one or more of the electrodes associated with the display region. A gate may be associated with each electrode.

In an embodiment at least two electrodes associated with the display region may be connected to different voltage sources of the display driving system.

The electrodes associated with the display areas may be controlled by a common voltage source, thereby simplifying the control of the electrodes in the display device. Equally, two or more display areas may be controlled together, at the same time. For example, where (as described above) the display is able to provide transflective operation, a single voltage source may be connected to the electrodes associated with both the reflective display area and the transmissive display area of the display region and drive the electrodes together.

In an embodiment the display device may be arranged such that the coverage of the first fluid over both the first display area and the second display area is reduced in a transition between a first and a second operational state.

In this situation, the first fluid is not simply moved over the display region, i.e. from the first display area to the second display area, but rather the shape of the volume of the first fluid is changed such that both the coverage of the first fluid over the first display areas and the coverage of the first fluid over the second display area are reduced. By contrast, in a bi-stable device as mentioned above, the coverage of the first fluid over the first display area will correspondingly increase as the coverage of the first fluid over the second display area decreases and vice versa.

In an embodiment the display region may comprise a first surface surrounded by a second surface, wherein the first surface is less wettable to the second fluid than the second surface such that the first fluid is confined in the display region.

In an embodiment the display apparatus may be arranged to provide a first display effect associated with the first display area and a second display effect associated with the second display area.

In accordance with further embodiments, there is provided an electrowetting display device comprising a first support plate, a second support plate and a space between the first and second support plates, there being in the space a first fluid and a second fluid immiscible with each other, the first support plate having a plurality of display regions on a surface facing the space, the first fluid adjoining the surface and being confined to and movable over the display region; the display region comprising at least a first display area and a second display area; the first support plate comprising at least a first electrode and a second electrode, the first electrode being associated with the first display area and the second electrode being associated with the second display area, the first and second display area and the first and second electrode being configured to control independently the coverage of the first fluid over the first display area and the coverage of the first fluid over the second display area by applying voltages to the first electrode and the second electrode.

An overview of an electrowetting display apparatus according to examples of embodiments will now be described with reference to FIGS. 1A and 1B.

FIG. 1A shows a top view schematic of an electrowetting display apparatus 2. The apparatus 2 comprises an electrowetting display device 4 and a display driving system 6 connected to the display. As will be described in more detail below, the display driving system 6 provides varying voltage signals to the display device 4 to cause the display to operate in the desired fashion. The display device 4 has a plurality of display regions 8, which will be described in more detail below. The display regions 8 provide a display effect when driven by the display driving system 6.

FIG. 1B shows a side view schematic of the display device 4. The display device has a first support plate 10, and a second support plate 12. A space 14, between the first and second support plates contains first and second fluids, immiscible with each other. The first fluid is electrically non-conductive and may for instance be an alkane like hexadecane or (silicone) oil. The first fluid may be opaque, but may be coloured or white. The second fluid 15 is electrically conductive or polar, and may be water or a salt solution such as a solution of potassium chloride in a mixture of water and ethyl alcohol. The second fluid may be transparent, coloured, white, absorbing or reflecting.

The first support plate 10 has a plurality of display regions 8 on a surface 16 of the first support plate, the surface 16 facing the space. The first fluid adjoins the surface 16. Portions of first fluid are confined to and movable over each of the display regions 8, as will be described in greater detail below.

FIGS. 2A and 2B show a schematic of a portion of the display device having a single display region 8 according to a first embodiment. FIG. 2A shows a schematic top view of a portion of the display device 4. The surface 16 of the first support plate 10 comprises a display region 8, which is surrounded by a boundary 20.

A portion of the first fluid 26 (as described above) adjoins the display region 8 and is constrained within the display region 8 by boundary 20. In being constrained, the first fluid 26 is unable (under normal operation of the display) to pass into the neighbouring display regions. However, the portion of the first fluid is able to move over the display region 8. This may lead to the first fluid 26 occupying a continuous volume within the display region 8; that is the portion of the first fluid 26 in the display region 8 is not separated. It will be apparent that a similar structure is used for the other display regions of the display device 4; that is, other portions of the first fluid adjoin the display regions and are constrained by boundaries.

To constrain the first fluid 26, the display region 8 may be formed of a first surface less wettable to the second fluid and the boundary 20 may be formed from a second surface more wettable to the second fluid. When the first fluid is oil and the second fluid water, the display region 8 may be hydrophobic and the boundary 20 may be hydrophilic. The wettability properties of the display region 8 and boundary 20 may be obtained by a suitable choice of material, treatment of the support plate surface 16 or application of a layer on the support plate surface 16. The display region 8 may be formed for instance by an amorphous fluoropolymer layer such as AF1600 or another low surface energy polymer. The hydrophobic character causes the first fluid to adhere preferentially to the display region 8 since the hydrophobic layer has a higher wettability with respect to the first fluid than it has with respect to the second fluid. The boundary 20 may be formed by a photoresist layer, for instance SU-8.

The display region 8 is divided into two display areas 22 and 24, marked by dashed lines. Associated with each display area is an electrode (not shown in FIG. 2A but described below). As will be apparent from the description below, in embodiments, the display areas may have identical structural properties, i.e. are a part of the same display region 8, and thus may differ only in functional properties.

FIG. 2B shows a schematic cross section taken along the line A-A in FIG. 2A. First support plate 10 has surface 16, the surface 16 is shown having a display region 8, and boundary 20. In FIG. 2B, the boundary 20 is a region raised above the level of the display region 8, forming a wall confining the first fluid to the display region 8. A portion of the first fluid 26 is shown adjoining the display region 8 and constrained by the boundary 20. It will be understood that in some embodiments, the boundary 20 may not be a wall, and may be in the same plane as the display region 8. As such, a suitable choice of materials may be used to constrain the first fluid 26. Moreover, it should be noted that the shape of the interface between the first and second fluids shown in FIG. 2B (a half ellipse) is purely schematic, and that the interface shape in embodiments may be closer to that of a straight line.

As in FIG. 2A, the display region 8 is divided into two display areas. The extent of these display areas are denoted by dashed lines 22' and 24'. Two electrodes 28 and 30 are provided beneath the surface 16 of the support plate 10. Electrodes 28 and 30 are associated with display areas 22' and 24', respectively. The electrodes 28 and 30 are connected to the display driving system 6, which controls the voltage provided to the electrodes 28 and 30.

The operation of the display apparatus will now be described for the display region of FIG. 2A with reference to FIGS. 3A to 3C.

In FIG. 3A, both electrodes 28 and 30 are in an 'off' state, which may correspond to the electrode being held at zero volt, with the second fluid also at zero volt (thus the voltage or potential difference between the second fluid and the electrodes is zero volt). Consequently, the first fluid 26A, represented by the dark region, covers the entire display region 8.

In FIG. 3B, the electrode 28 (corresponding to display area 22) is in an 'off' state, while electrode 30 (corresponding to display area 24) is in an 'on' state. Here an 'on' state may correspond to the electrode being provided with a predetermined voltage, which may be selected based on factors such as the size of the area and the fluids used. The second fluid may still be at zero volt, therefore a voltage or potential difference is provided between the electrode 30 and the second fluid. Consequently, the first fluid 26B is moved so as to cover the display area 22, but to be absent from over display area 24.

This demonstrates that, in this embodiment, a display area may independently have complete and zero coverage. This is because the first fluid may flow from the display area 24 into the display area 22 and vice versa. By contrast, in a known display device (this being a display device where the first fluid is confined to a display area, rather than to a display region having multiple display areas), the fluid is retained within the display area, and thus the minimum coverage of the first fluid is limited (and will likely be in the region of 10 to 30%). Such operation improves aperture which may be achieved by the display, which has the effect of, amongst other things, improving the contrast and efficiency of the display.

FIG. 3C shows a state in which both electrodes 28 and 30 are at an intermediate voltage, which will be selected based on design factors of the display (the second fluid may again be at zero volt, therefore voltages or potential differences are provided between the electrodes and the second fluid). The coverage of the first fluid 26C is therefore partial over both display areas 22 and 24. This demonstrates that the two display areas may be independently controlled to provide a selectable and controllable partial coverage. In this example, the voltages applied to the electrodes are different, leading to differing coverage of the first fluid over the two display areas 22 and 24. This may be used to achieve a gradation of colour or greyscale in the display.

FIGS. 4A to 4D show an alternative arrangement for two display areas. With reference to FIG. 4A, the display areas 29 and 31 (represented by dashed lines) both have a quarter circle removed from a corner. The shape of the display areas 29 and 31 are determined by the shape of the electrodes, therefore it is understood that the electrodes in the first support plate 10 have a corresponding shape to the display areas shown. This leaves a hemispherical collection area 34 within the display region which is not associated with either electrode. This collection area may collect, or act as a reservoir, for the first fluid 32A . . . D. It will be understood that the hemispherical arrangement for the collection area 34, and for the cut-outs of the display areas, is purely exemplary and any shape may be used.

In operation, voltages may be applied to the electrodes associated with the display areas 29 and 31 to control the coverage of the first fluid 32A . . . D over the display region. As above, the second fluid may be at zero volt. Therefore, as shown in FIG. 4A, the electrodes may be in an 'off' state, and consequently the first fluid, represent by black area 32A, covers the display region 8.

As shown in FIG. 4B, if a voltage is applied to only one electrode (in this example, the electrode associated with display area 29), then the coverage of the first fluid (now referenced 32B) may be forced away from display area 29. Consequently, as shown, there is only partial coverage of the first fluid 32B over the display area 29, with full coverage over the display area 31.

Figure 4C:
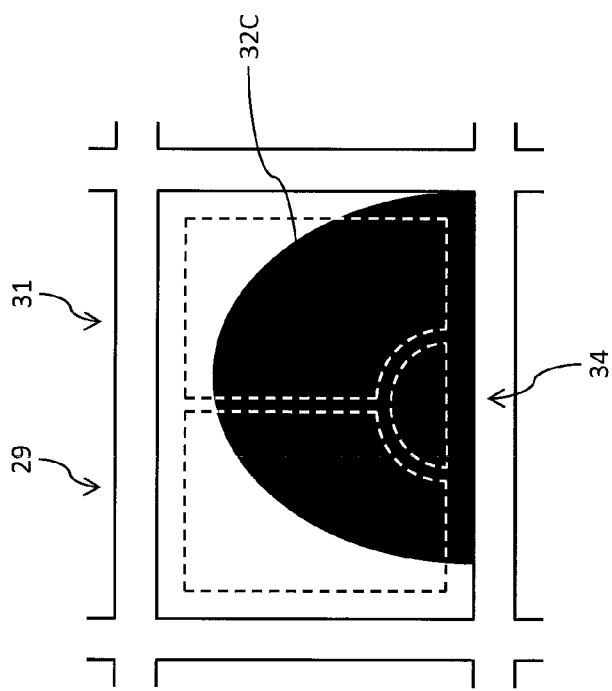

FIG. 4C represents the situation where voltages are applied to both electrodes associated with the display region. Thus there is partial coverage of the first fluid over both display area 29 and display area 31, as represented by region 32C.

Finally, FIG. 4D represents the situation in which both electrodes associated with display areas 29 and 31 are in an 'on' state (or are being held at a maximum voltage), and therefore the first fluid, represented by shaded region 32D, is localised over the collection area 34.

Therefore, it can be seen that by varying the voltage on the electrodes associated with display areas 29 and 31, the coverage of the first fluid 32A . . . D over the display region may be controlled, with independent control for both display areas.

This arrangement may maintain some of the advantages of the arrangement described above with reference to FIGS. 3A to 3C, in that, because each display area serves to collect at least some of the fluid from the other display area, the size of the collection area may be reduced. Only when both display areas are at or close to a minimal coverage state, as represented in FIG. 4D, might the capacity of the collection area be exceeded, causing some first fluid to partially cover the display area. Since such states are rare, an acceptable loss in aperture (for such states) may be balanced against being able to have a larger controllable display area, and thus more contrast (in all but the extreme, minimal coverage state).

In some embodiments, the collection area 34 may itself be associated with an electrode, which may be held at zero volt. This increases the affinity of the collection area 34 for the first fluid 32A . . . D, and thus improves the action of the collection area 34.

FIGS. 5A, 5B and 6A to 6D represent a further embodiment. In this embodiment, a display region 36 is surrounded by a boundary 38. The display region 36 is less wettable to the second fluid (described above) and the boundary 38 more wettable to the second fluid. A portion of the first fluid 26 (as described above) adjoins the display region 36, and by virtue of the relative wettability of the display region 36 and boundary 38, is constrained within the display region 36.

It will be understood that the display region 36 and boundary 38 are analogous to display region 8 and boundary 20 described above with reference to FIGS. 2A and 2B. Equally, it will be understood that the display region 36 described here may be used with the display apparatus 2 described in FIGS. 1A and 1B.

Within the display region are three display areas, 40, 42 and 44, each display area represented by a dashed box. The display areas are arranged in three adjacent rectangles; however any suitable arrangement may be used. The first display area 40 is transmissive. This means that the portion of the display region 36 corresponding to the transmissive display area 40 is configured to allow light to pass through it. A known light source (not shown) may be provided behind this transmissive display area 40. The other display areas, 42 and 44 are reflective, meaning that the portion of the display region 36 corresponding to the display areas 42 and 44 will reflect light on the display device.

In FIG. 5A, the reflective surface is indicated by the reference numerals 46 and 48, while the transmissive surface is lightly shaded and indicated by reference numeral 50. Methods of constructing displays having reflective or transmissive surfaces are known in the art, and consequently, the techniques by which the surfaces may be made to reflect or transmit light will not be described in detail. Equally, methods of providing an appropriate light source behind a transmissive surface are known. A collection area, or reservoir, 45 may be provided outside the display areas 40, 42 and 44 to collect first fluid in a similar manner to that described above.

FIG. 5B is a schematic cross section taken along the line B-B in FIG. 5A. As with FIG. 5A, the display region 36 is surrounded by a boundary 38. The extent of the display areas 40, 42 and 44 are represented by dashed lines 40', 42' and 44'. A first electrode 52 is associated with the first display area 40, and is located below that display area. Second electrodes 54 and 56 are associated with the display areas 42 and 44. The area of the electrodes corresponds to the display areas/dashed boxes in FIG. 5A. In some embodiments, the electrodes themselves may govern whether the associated display area is reflective or transmissive. That is, the material used to form the electrodes may itself be reflective or transparent to visible light.

A portion of first fluid 58 adjoins the display region 36 of the support plate and, in a similar manner to that described above with reference to FIG. 2B, is constrained to the display region 36 by the boundary 38. In addition, the display region 36 has a profile, in cross section, such that, without voltages applied to the electrodes, the depth of the first fluid 58 over the transmissive display area 40 is greater than the depth of the fluid over the reflective display areas 42 and 44. In other words, the display region is provided with a channel 60 in the display region 36.

Channel 60 may be provided to achieve a similar attenuation for reflected light, passing through the layer of first fluid twice, and transmitted light, passing through the layer of first fluid once.

The embodiment of FIGS. 5A and 5B is capable of transmissive, reflective, and transflective operation. This operation will be described with reference to FIGS. 6A to 6D.

Figure 6B:
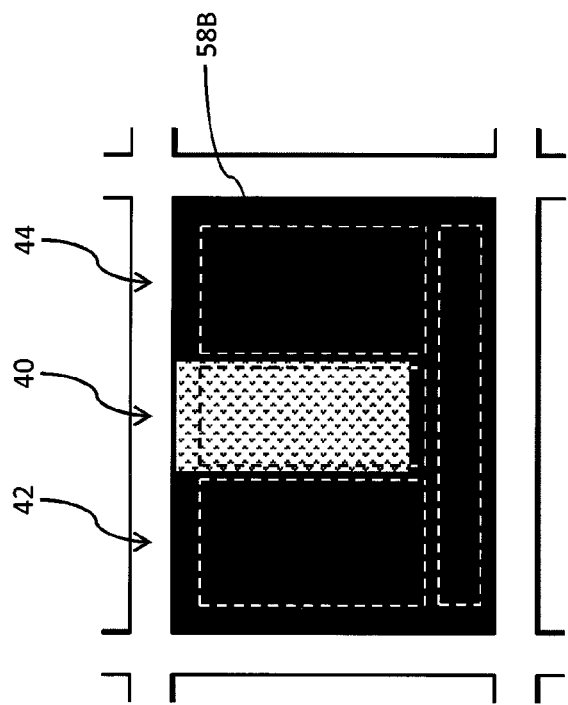
FIG. 6A to 6D show the display region of FIGS. 5A and 5B in operation.
Figure 6A:
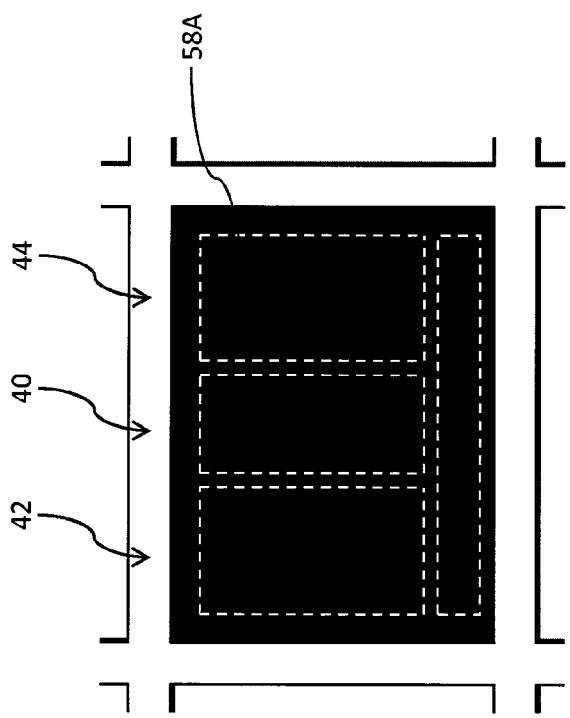

FIG. 6A shows a layer of first fluid 58A covering the whole of the display region 36, including display areas 40, 42 and 44. This configuration of the first fluid 58A is achieved when the electrodes 52, 54 and 56 associated with the display areas 40, 42 and 44 are being held at the same voltage as the second fluid, typically zero volt.

FIG. 6B shows a configuration of the first fluid 58B, in which the layer of the first fluid 58B partially covers the display region 36. The layer covers the whole of display areas 42 and 44, and only a fraction of display area 40. This configuration of the first fluid 58B is achieved when a voltage is applied to the electrode 52. This creates a potential difference between the second fluid and the electrode causing the second fluid to be attracted to the surface of the display region 36 over the transmissive display area 40 and forcing the first fluid 58B away. The coverage of the first fluid 58B over the transmissive display area may be controlled by varying the voltage on the electrode 40. The reflective display areas 42 and 44 are fully covered by the first fluid 58B; this may be caused by the electrodes 54 and 56 (corresponding to display areas 42 and 44) being held at zero volt (such that there is no voltage or potential difference between the second fluid and the electrodes 54 and 56). Therefore, as is shown, the display may operate in a transmissive mode, in which minimal light is reflected from the display.

Figure 6D:
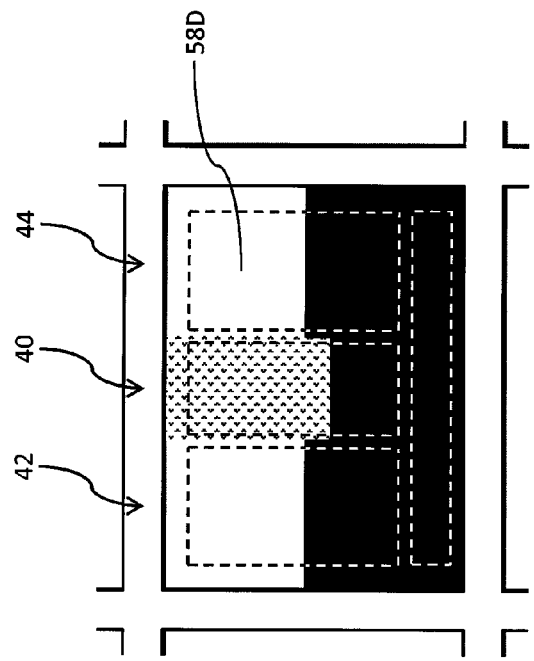
Figure 6C:
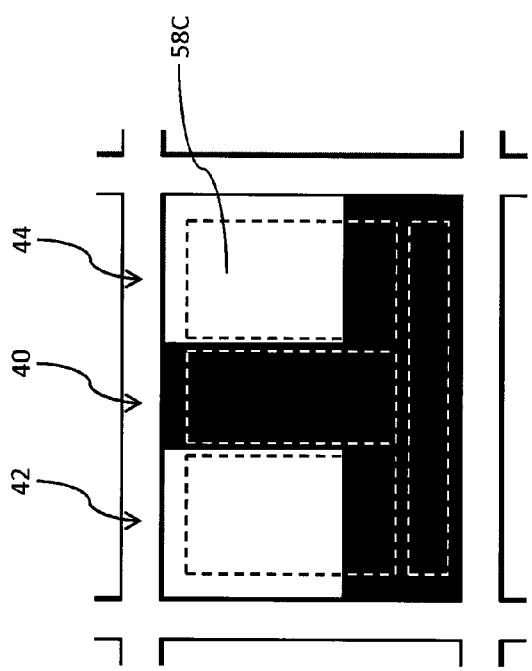

FIG. 6C shows a further configuration of the first fluid 58C. This configuration of the first fluid 58C is achieved when a voltage is applied to the electrodes 54 and 56. This causes the second fluid to be attracted to the surface of the display region 36 over the reflective display areas 42 and 44, forcing the first fluid 58C away. The coverage of the first fluid 58C over the reflective display areas may be controlled by varying the voltage on the electrodes 42 and 44. The transmissive display area 40 is fully covered by the first fluid 58C; this may be caused by the electrode 52 (corresponding to display area 40) being held at zero volt (such that there is no voltage or potential difference between the second fluid and the electrode 52). Therefore, as is shown, the display may operate in a reflective mode, in which minimal light is transmitted through the transmissive display area 40.

FIG. 6D shows a further configuration of the first fluid 58D. This configuration of the first fluid 58D is achieved when voltages are applied to all of the electrodes 52, 54 and 56. This causes the second fluid to be attracted to the surface of the display region 36 over both the transmissive display area 40, and the reflective display areas 42 and 44, forcing the first fluid 58D away. The coverage of the first fluid 58D over the display areas may be controlled by varying the voltage on the electrodes 40, 42 and 44. Therefore, as is shown, the display may operate in a transflective mode, in which the display operates as both a transmissive type display and a reflective type display.

As can be seen in FIG. 6D, the fractional coverage of the first fluid 58D over the transmissive display area 40 may be different from the fractional coverage over the reflective display areas 42 and 44. This may be done to balance the display effects between the reflective and transmissive display areas. However in some embodiments, the device may, in the transmissive mode, control the display areas together with the same voltage applied to all three electrodes 52, 54 and 56.

Methods of driving an electrowetting display are known from, inter alia, WO 2008/119774. This document describes active matrix driving and the distribution of electronics between the driving system and the display device. Three examples of control circuits which may be embodied in the display apparatus for controlling the display devices described above will now be described with reference to FIGS. 7A to 9B. These circuits may be used in conjunction with circuitry described in WO 2008/119774. These circuits may be arranged within the first support plate 10 (as described above in FIGS. 1B and 2B). The source data lines and the gate lines may be connected to the display driving system 6 as described in FIG. 1A.

Each of the described circuits is configured to drive only two display areas/electrodes, however it will be readily apparent to the skilled person how the circuits may be used to drive three or more display areas/electrodes. It will further be apparent that the two reflective display areas described above may be controlled by the same signal, connected to both electrodes.

In all of the circuits one or more source data lines are provided. A variable voltage, representing a display state, may be applied to the source data lines to control the coverage of the first fluid over the display areas. Typically, in a display device, a source data line will provide such a driving voltage to a plurality of display regions.

One or more gate lines are provided. An on/off signal may be applied to these gate lines to selectively connect the source data line to one or more of the electrodes in the display.

Figures 7A, 7B:
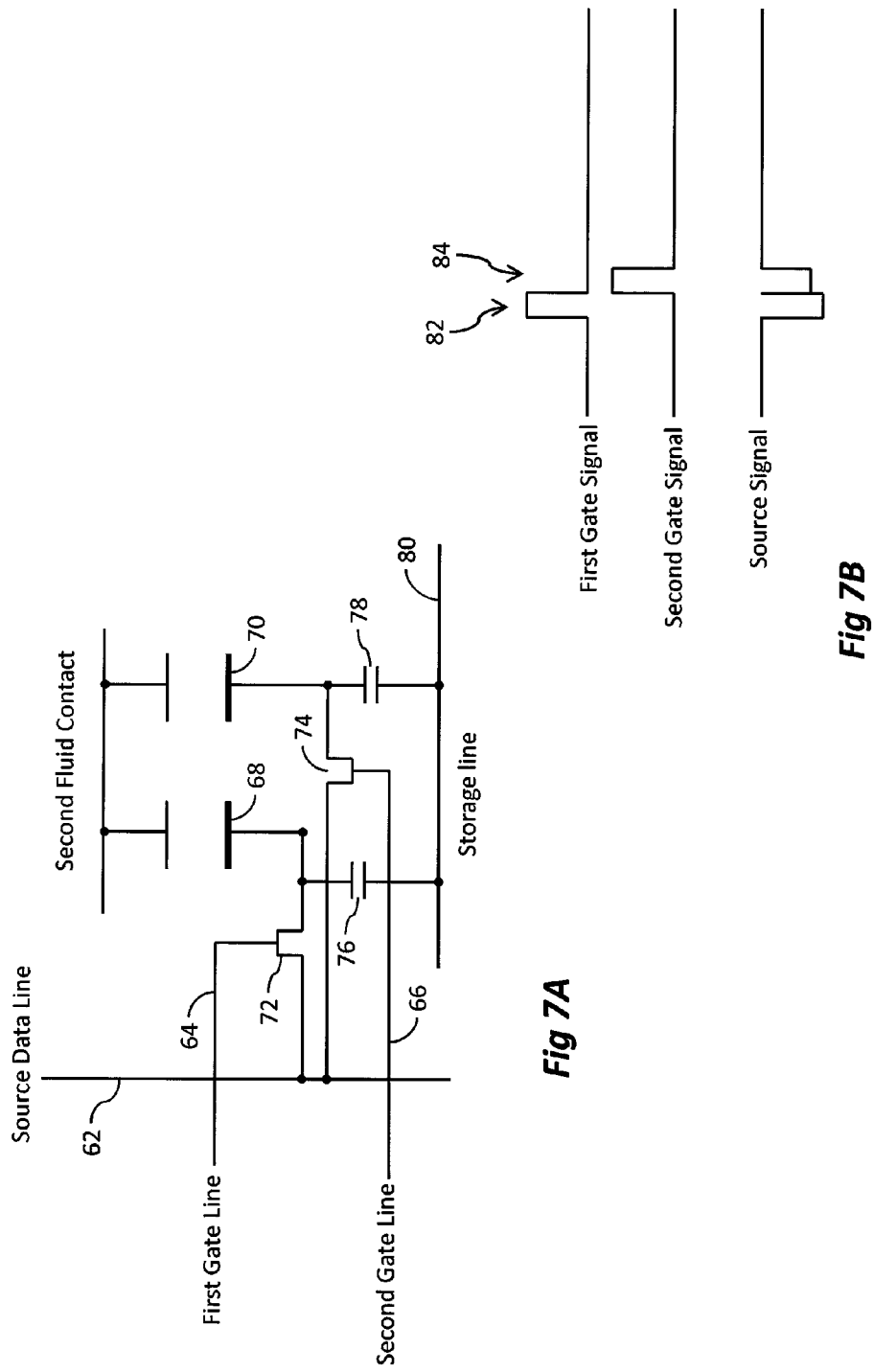

In FIG. 7A, a single source data line 62 and two gate lines 64 and 66 are provided to control electrodes 68 and 70. The first gate line 64 drives a first transistor 72. The second gate line 66 drives a second transistor 74. The transistors 72 and 74 connect the source data line 62 to the electrodes 68 and 70. In addition, storage capacitors 76 and 78 are connected between the electrodes and a storage line 80 to act as buffers for the charge on the electrodes.

The operation of this circuit will be described with reference to FIG. 7B. FIG. 7B shows the voltages on the lines 62, 64 and 66. At a first point in time 82, an 'on' signal (typically a predetermined voltage) is provided on the first gate line 64, represented by the voltage pulse in the first gate signal. This 'on' signal causes the transistor 72 to connect the electrode 68 to the source data line 62.

Concurrently, the source data line 62 provides the voltage to which the electrode 68 is to be driven. This voltage is maintained on the electrode by the storage capacitor 76 until the next time the transistor 72 connects the source data line to the electrode.

Subsequently, at a second point in time 84, an 'on' signal is provided on the second gate line 66, represented by the voltage pulse in the second gate signal. This 'on' signal causes the transistor 74 to connect the electrode 70 to the source data line 62. The first gate signal to the transistor 72 will concurrently drop to an off state, isolating the electrode 68 from the source data line 62.

Concurrently, the source data line 62 provides the voltage to which the second electrode 70 is to be driven. As can be seen this voltage may be different to the voltage provided to the first electrode 68. This voltage will charge up capacitor 78 such that any subsequent leakage of charge will be compensated for. Subsequently, transistor 74 is closed by virtue of the voltage on the second gate line 66 dropping to its original level.

The circuit above allows a single source data line and two gate lines to drive the multiple electrodes within a display region. This has cost savings as multiple source lines do not need to be provided.

The circuit in FIG. 8A is similar to that in FIG. 7A, except that two separate source data lines 86 and 88 are provided, and only a single gate line 90. Transistors 92 and 94 are controlled by gate line 90, and respectively serve to connect the first source data line 86 to the first electrode 96, and the second source data line 88 to the second electrode 98. As with FIG. 7A above, capacitors 100 and 102 connect the electrodes 96 and 98 respectively to a storage line 104.

In operation, the gate signal changes to an 'on' state, connecting the electrodes 96 and 98 to respective source data lines 86 and 88. During this time period, the first and second source data lines 86 and 88 will provide the voltages to the first and second electrodes. This may happen concurrently, or (as shown) the source data lines may be driven one after the other.

Thus the two source data lines 86 and 88 are able to drive the two electrodes 96 and 98 so as to control independently the coverage of the first fluid over the display areas in the display region. Thus, the refresh time of the display may be reduced, compared with the circuit described above in FIGS. 7A and 7B. However, the additional source line may increase the cost of the display.

FIG. 9 shows a circuit in which a single source data line 106 drives two electrodes 116 and 118 through transistors 112 and 114 respectively, the transistors 112 and 114 being controlled by first and second gate lines 108 and 110 respectively. However in this case, the transistors are connected in serial. Thus, the source data line may drive only electrode 116, or both electrode 116 and 118. Thus, one of capacitors 120 and 122 (connecting electrodes 116 and 118 to the storage line 124) may be excluded, as represented by dashed capacitor 122. However it is apparent that when electrode 118 is being driven, then electrode 116 also has to be driven. This may be of benefit in a limited, two-mode version of the transflective display described above where the display is designed to operate in either a transflective mode or in one of the reflective or transmissive modes (but not the other).

The drive scheme used in the embodiment described in FIG. 9A requires the first gate to be open for the period when only the first electrode is being driven, as well as during the period in which the second electrode is being driven.

Figure 10B:
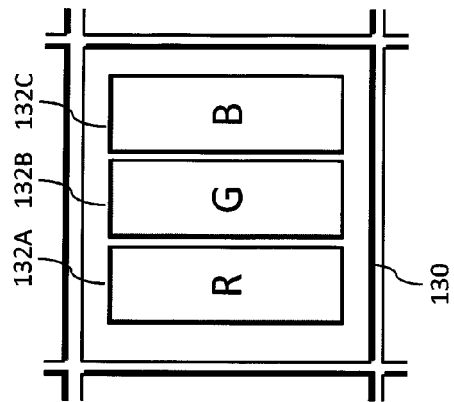
FIGS. 10A to 10C show arrangements of colour filters according to embodiments.
Figure 10A:
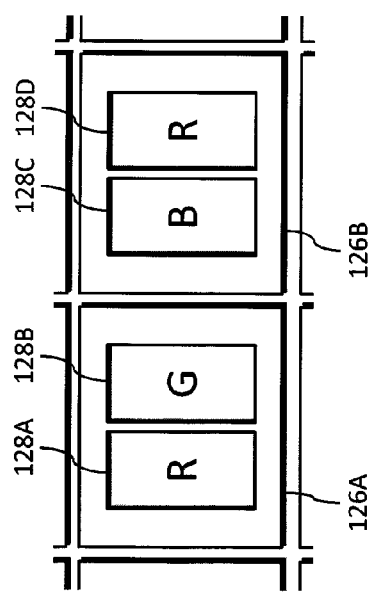
Figure 10C:
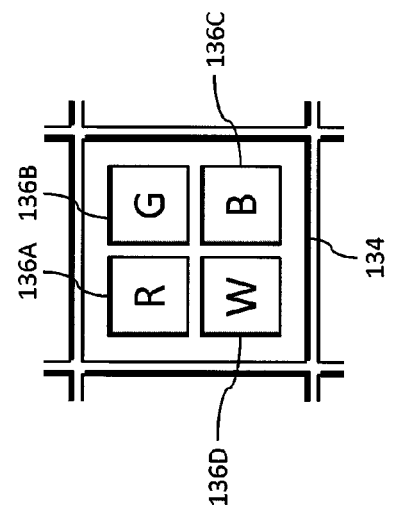

In some embodiments, the display regions may be associated with colour filters so as to provide a colour display. In particular, different display areas of a given display region may be associated with different colour filters so that the display region is able to independently provide two or more colours. FIGS. 10A to 10C show some configurations of colour filters which may be used in embodiments.

It will be understood that providing colour filters with an electrowetting display is known in the art, and therefore the nature of the filters will not be described in detail.

FIG. 10A shows a first arrangement of colour filters. Each display region 126 is provided with two display areas 128. Each display region is further associated with a red, green or blue colour filter, marked R, G and B respectively. The filters are positioned so as to filter light associated with a respective display area. Each display region therefore has two out of the three R, G, or B filters associated with it.

Two display regions, referenced as 126A and 126B are shown. The first display region, 126A, is associated with a red (R) and a green (G) filter 128A and 128B respectively. The second display region, 126B is associated with a blue (B) and a red (R) filter 128C and 128D respectively. It will be apparent that the pattern R, G, B is repeated across the rows of display regions. Thus for every three display regions 126, two full colour pixels may be provided, each pixel comprising of three display areas, each associated with different ones of red, green and blue. The pattern may be repeated for adjacent rows of display regions 126. Other arrangement may be possible, such as using red, green, blue and white (i.e. clear).

FIG. 10B shows an alternative arrangement, in which a single region 130 is provided with one each of red, green and blue filters associated with display areas 132A, 132B and 132C respectively, arranged in a linear fashion. Each region therefore represents a full colour pixel as described above; that is the display region in itself is able to provide a full colour pixel.

Finally, FIG. 10C shows an alternative arrangement in which a display region 134 is provided with a red, green, blue and white (i.e. clear or uncoloured) filter, each associated with one of display areas 136A, 136B, 136C and 136D respectively. The filters/areas are arranged in a square pattern. In this arrangement, the display region forms a full colour pixel with enhanced contrast by virtue of the white (unfiltered) display area 136D.

It will be apparent that the examples of red, green, blue (the additive primary colours) and/or white are purely examples, and any set of colour filters may be used. In other words, a two colour display may be formed, or alternatively cyan, magenta and yellow (the subtractive primary colours) may be used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims. The features of the claims may be combined in combinations other than those specified in the claims.

What is claimed is:

1. A display apparatus including an electrowetting display device and a display driving system, the electrowetting display device comprising a first support plate, a second support plate and a space between the first and second support plates, there being in the space a first fluid and a second fluid immiscible with each other, the first support plate having a plurality of display regions on a surface thereof,
   the first fluid adjoining the surface and being confined to and movable over a display region of the plurality of display regions;
   the display region comprising at least a first display area and a second display area;
   the first support plate comprising at least a first electrode and a second electrode, the first electrode being associated with the first display area and the second electrode being associated with the second display area,
   wherein: the display driving system is arranged to apply first and second voltages to the first and second electrodes, respectively, to control a coverage of the first fluid over the display region, and
   the display apparatus is arranged such that a coverage of the first fluid over the first display area and a coverage of the first fluid over the second display area are independently controllable.

2. The display apparatus of claim 1, wherein the first fluid confined within the display region occupies a continuous volume.

3. The display apparatus of claim 1, wherein the display region comprises a first fluid collection area.

4. The display apparatus of claim 3, wherein said first fluid collection area is associated with a further electrode which is maintainable at a predetermined voltage.

5. The display apparatus of claim 4, wherein the predetermined voltage is substantially zero.

6. The display apparatus of claim 3, wherein, upon application of a voltage to one or more of: the first electrode or the second electrode, at least part of the first fluid adjoins the first fluid collection area.

7. The display apparatus of claim 3, wherein, upon application of a voltage to one or more of: the first electrode or the second electrode, movement of at least part of the first fluid tends towards the first fluid collection area.

8. The display apparatus of claim 3, wherein the first fluid collection area is a different area than the first display area and the second display area.

9. The display apparatus of claim 1, wherein the electrowetting display device comprises a plurality of colour filters associated with the plurality of display regions, and wherein a given display region of the plurality of display regions is associated with at least two differently coloured filters of the plurality of colour filters.

10. The display apparatus of claim 1, the display region comprising a third display area, wherein the first, second and third display areas are associated, respectively, with differently coloured filters.

11. The display apparatus of claim 1, wherein the first display area is arranged to reflect incident light, and the second display area is arranged to transmit light, and wherein the electrowetting display device comprises a light source arranged to provide light to be transmitted through the second display area.

12. The display apparatus of claim 11, wherein the surface is configured such that a depth of the first fluid adjoining the second display area is greater than a depth of the first fluid adjoining the first display area.

13. The display apparatus of claim 11, wherein the display region comprises two of said first display area and one said second display area.

14. The display apparatus of claim 1, wherein a plurality of transistor gates are associated with each display region, the plurality of transistor gates being arranged to selectively connect a variable voltage source of the display driving system to one or more of the first or second electrodes associated, respectively, with the first and second display areas.

15. The display apparatus of claim 14, wherein a respective transistor gate of the plurality of transistor gates is associated with each of the first and second electrodes.

16. The display apparatus of claim 1, wherein at least two electrodes, including said first and second electrodes, associated with the display region are connected, respectively, to different voltage sources of the display driving system.

17. The display apparatus of claim 1, wherein the electrowetting display device is arranged such that the coverage of the first fluid over both the first display area and the second display area is reduced in a transition between a first and a second operational state of the electrowetting display device.

18. The display apparatus of claim 1, wherein the display region comprises a first surface surrounded by a second surface, wherein the first surface is less wettable to the second fluid than the second surface such that the first fluid is confined in the display region.

19. The display apparatus of claim 1, wherein the display apparatus is arranged to provide a first display effect associated with the first display area and a second display effect associated with the second display area.

20. An electrowetting display device comprising a first support plate, a second support plate and a space between the first and second support plates, there being in the space a first fluid and a second fluid immiscible with each other, the first support plate having a plurality of display regions on a surface thereof,
  the first fluid adjoining the surface and being confined to and movable over a display region of the plurality of display regions;
  the display region comprising at least a first display area and a second display area;
  the first support plate comprising at least a first electrode and a second electrode, the first electrode being associated with the first display area and the second electrode being associated with the second display area,
  the first and second display areas and the first and second electrodes being configured to control independently a coverage of the first fluid over the first display area and a coverage of the first fluid over the second display area by applying voltages to the first electrode and the second electrode.

21. An electrowetting display device according to claim 20, wherein the display region comprises a first fluid collection area.

22. An electrowetting display device according to claim 21, wherein said first fluid collection area is associated with a further electrode which is maintainable at a predetermined voltage.

23. An electrowetting display device according to claim 20, wherein the electrowetting display device is arranged such that the coverage of the first fluid over both the first display area and the second display area is reduced in a transition between a first and a second operational state of the electrowetting display device.

* * * * *